United States Patent
Yang et al.

(10) Patent No.: US 8,071,231 B2
(45) Date of Patent: Dec. 6, 2011

(54) SECONDARY BATTERY INCLUDING ONE-WAY EXHAUST VALVE

(75) Inventors: Seung-Jin Yang, Daejeon (KR); Jeong Hee Choi, Busan (KR); Hanho Lee, Daejeon (KR); Ji Heon Ryu, Seoul (KR)

(73) Assignee: LG Chem, Ltd. (KR)

( * ) Notice: Subject to any disclaimer, the term of this patent is extended or adjusted under 35 U.S.C. 154(b) by 149 days.

(21) Appl. No.: 12/310,604

(22) PCT Filed: Aug. 25, 2007

(86) PCT No.: PCT/KR2007/004095
§ 371 (c)(1),
(2), (4) Date: Sep. 28, 2009

(87) PCT Pub. No.: WO2008/026854
PCT Pub. Date: Mar. 6, 2008

(65) Prior Publication Data
US 2010/0239895 A1 Sep. 23, 2010

(30) Foreign Application Priority Data
Aug. 28, 2006 (KR) .................. 10-2006-0081422

(51) Int. Cl.
H01M 2/12 (2006.01)
(52) U.S. Cl. .......................................... 429/53
(58) Field of Classification Search ............ 429/53
See application file for complete search history.

(56) References Cited

U.S. PATENT DOCUMENTS

| | | | |
|---|---|---|---|
| 3,638,765 | A | 2/1972 | Flaherty et al. |
| 5,004,655 | A | 4/1991 | Symanski |
| 6,994,932 | B2 | 2/2006 | Kinkelaar et al. |
| 2003/0008193 | A1 | 1/2003 | Kinkelaar et al. |

FOREIGN PATENT DOCUMENTS

| | | |
|---|---|---|
| JP | 7045266 | 2/1995 |
| JP | 9237619 | 9/1997 |
| JP | 11-086823 A | 3/1999 |
| JP | 11086823 A * | 3/1999 |
| JP | 2000149979 | 5/2000 |
| JP | 2001-093489 A | 4/2001 |

(Continued)

OTHER PUBLICATIONS

International Search Report, PCT/KR2007/004095.

*Primary Examiner* — Karie O'Neill Apicella
(74) *Attorney, Agent, or Firm* — Lerner, David, Littenberg, Krumholz & Mentlik, LLP

(57) ABSTRACT

Disclosed herein is a plate-shaped secondary battery constructed in a structure in which an electrode assembly of a cathode/separator/anode structure is mounted in a battery case, and the battery case is sealed by thermal welding, wherein the secondary battery has at least one valve (one-way exhaust valve), having a small thickness, mounted at a sealed portion, formed at the outer circumference of an electrode assembly receiving part of the battery case, for allowing internal high-pressure gas to be exhausted out of a battery cell and preventing external gas from being introduced into the battery cell. The secondary battery according to the present invention has the effect of effectively exhausting internal high-pressure gas generated during the abnormal operation of the battery, such as overcharge, out of the battery case, while maintaining the sealability of the battery case, thereby simultaneously improving the efficiency and safety of the battery.

11 Claims, 6 Drawing Sheets

FOREIGN PATENT DOCUMENTS

| | | | |
|---|---|---|---|
| JP | 2003-037028 A | | 2/2003 |
| JP | 2003037028 A | * | 2/2003 |
| JP | 2005-116235 A | | 4/2005 |
| JP | 2007-059495 A | | 3/2007 |
| KR | 20010082058 A | | 8/2001 |
| KR | 20010082059 A | | 8/2001 |
| KR | 20010082060 A | | 8/2001 |
| KR | 20020042598 | | 6/2002 |

* cited by examiner

SECONDARY BATTERY INCLUDING ONE-WAY EXHAUST VALVE

CROSS REFERENCE TO RELATED APPLICATIONS

The present application is a national phase entry under 35 U.S.C. §371 of International Application No. PCT/KR2007/004095, filed Aug. 25, 2007, published in English, which claims the benefit of Korean Patent Application No. 10-2006-0081422, filed Aug. 28, 2006. The disclosures of said applications are incorporated by reference herein.

FIELD OF THE INVENTION

The present invention relates to a secondary battery including a one-way exhaust valve, and, more particularly, to a plate-shaped secondary battery constructed in a structure in which an electrode assembly of a cathode/separator/anode structure is mounted in a battery case, and the battery case is sealed by thermal welding, wherein the secondary battery has at least one valve, having a small thickness, mounted at a sealed portion, formed at the outer circumference of an electrode assembly receiving part of the battery case, for allowing internal high-pressure gas to be exhausted out of a battery cell and preventing external gas from being introduced into the battery cell.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having a high energy density and a high discharge voltage, on which much research has been carried out and which is now commercialized and widely used.

Based on its external shape, the lithium secondary battery may be generally classified as a cylindrical battery, a prismatic battery, or a pouch-shaped battery. Based on its electrolyte, on the other hand, the lithium secondary battery may be classified as a lithium-ion battery, a lithium-ion polymer battery, or a lithium polymer battery.

As the mobile devices have been miniaturized, the demand of the rectangular battery and the pouch-shaped battery, which have a relatively small thickness, has increased. Especially, much interest is currently generated in the pouch-shaped battery because the shape of the pouch-shaped battery is easily changed, the manufacturing costs of the pouch-shaped battery are low, and the weight of the pouch-shaped battery is small.

Generally, the pouch-shaped secondary battery is manufactured by mounting an electrode assembly, including cathodes, anodes, and separators disposed respectively between the cathodes and the anodes, in a pouch-shaped battery case, constructed in a laminate structure of a resin layer/a metal film layer/a resin layer, and thermally welding a sealed portion, formed along the outer circumference of the battery case, to seal the battery case.

The sealed portion is a region formed by thermally welding the outer circumferential portions of the battery case surrounding the outer surface of the electrode assembly while the outer circumferential portions of the battery case are in contact with each other. It is required for the sealed portion of the battery case to exhibit sealability for preventing external air from being introduced into the battery case during the normal operation of the battery. Also, it is required for the sealing portions of the battery case to release the sealability, when high pressure is generated in the battery due to the abnormal operation of the battery, such as continuous charge and discharge for a long period of time or application of high temperature to the battery, to exhaust gas out of the battery case. Consequently, the sealed portion of the battery case is very important to improve the safety of the battery as well as the efficiency of the battery. However, the sealing function and the gas exhaust function are opposite action mechanisms, and therefore, it is difficult to effectively achieve both the sealing function and the gas exhaust function.

In this connection, there has been restrictively proposed only a structure for releasing the sealed portion when high pressure is generated in a plate-shaped secondary battery; however, there has been not proposed a structure for exhausting pressurized gas out of a plate-shaped secondary battery while maintaining the sealability of the secondary battery.

For example, Japanese Patent Application Publication No. 2005-116235 discloses a technology for forming a specific gas exhaust mechanism in a battery constructed in a structure in which the outer circumferential portions of a laminate film, in which an electrode assembly is mounted, are thermally welded to seal the laminate film. The disclosed technology includes a method of forming partially a non-welded part at the sealed portion, during the thermal welding process, to concentrate the pressure of internal gas to the non-welded part, and a method of deforming the innermost sealing layer of the laminate film such that the innermost sealing layer has an adhesive strength less than that of the remaining region of the laminate film.

However, experiments carried out by the inventors of the present invention revealed that the adhesive force of the sealed portion where the gas exhaust mechanism is formed is small, and therefore, moisture continuously permeates into the battery cell through the sealed portion where the gas exhaust mechanism is formed and an electrolyte continuously leaks from the battery cell through the sealed portion where the gas exhaust mechanism is formed, even during the normal operation of the battery, whereby the safety of the battery is seriously deteriorated. In consideration of a fact that the size of the non-welded part and the size of the adhesive strength must be precisely controlled within a specific range due to the above-mentioned problems, the disclosed technology has a fundamental problem in that it is difficult for the corresponding region to be reliably operated under a high pressure condition requiring the exhaust of gas.

On the other hand, Japanese Patent No. 3,638,765 discloses a battery constructed in a structure in which a plate-shaped electrode assembly is mounted in a sheathing member, and the outer circumferential portions of the sheathing member are attached to each other by thermal welding or an adhesive layer to seal the sheathing member, wherein the sheathing member is sealed while a polymer resin sheet, having a thermal safety higher than that of the sheathing member, is partially inserted between the outer circumferential portions, whereby the sealed portion having the polymer resin sheet exhibits a pressure resistance less than that of the remaining sealed portion. Also, Japanese Patent Application Publication No. 2001-093489 discloses a battery constructed in a structure in which an electrode assembly is mounted in a pouch-shaped battery case made of a laminate sheet, and cathode and anode leads, connected to cathode and anode plates of the electrode assembly, are exposed outward from the sealed portion of a sheathing case, wherein the thermal welding is carried out while a thermal welding resin sheet, having a melting point lower than that of the laminate sheet, is partially inserted in the sealed portion of the sheathing case.

However, the above-mentioned technologies do not secure the sealability and operational reliability of the battery.

On the other hand, technologies for exhausting gas from some devices in one direction are known, although the devices are not plate-shaped secondary batteries. For example, U.S. Pat. No. 5,004,655 discloses a lead battery including a spacer mounted around a battery receiving part, wherein an opening is formed at one side of the spacer, and silicon oil is applied to the opening, thereby preventing external moisture from permeating into the battery while allowing internal gas to be exhausted in one direction. Also, Japanese Patent Application Publication No. 2003-037028 discloses a condenser including a sheathing case constructed in a structure in which a metal film and a plastic film are stacked, wherein a gas exhaust valve of an oil sealing structure is mounted at the inside of the sheathing case, and a pin hole for exhausting gas out of the sheathing case is formed at the sheathing case outside the gas exhaust valve.

However, the one-way gas exhaust structure of these technologies is applicable to devices that are not seriously affected by moisture introduced into the devices, and therefore, the one-way gas exhaust structure is not structurally applicable to a plate-shaped secondary battery. In conclusion, no attempts have been made to apply the one-way gas exhaust structure to the plate-shaped secondary battery.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have found that, when a plate-shaped secondary battery, constructed in a structure in which an electrode assembly of a cathode/separator/anode structure is mounted in a battery case, and the battery case is sealed by thermal welding, is provided with a one-way exhaust valve, having a small thickness, mounted at a sealed portion, formed at the outer circumference of an electrode assembly receiving part of the battery case, for allowing internal high-pressure gas to be exhausted out of a battery cell and preventing external gas from being introduced into the battery cell, the secondary battery has the effect of effectively exhausting internal high-pressure gas generated during the abnormal operation of the battery, such as overcharge, out of the battery case, while maintaining the sealability of the battery case, thereby simultaneously improving the efficiency and safety of the battery. The present invention has been completed based on these findings.

In accordance with one aspect of the present invention, the above and other objects can be accomplished by the provision of a plate-shaped secondary battery constructed in a structure in which an electrode assembly of a cathode/separator/anode structure is mounted in a battery case, and the battery case is sealed by thermal welding, wherein the secondary battery has at least one valve (one-way exhaust valve), having a small thickness, mounted at a sealed portion, formed at the outer circumference of an electrode assembly receiving part of the battery case, for allowing internal high-pressure gas to be exhausted out of a battery cell and preventing external gas from being introduced into the battery cell.

Specifically, the secondary battery according to the present invention is constructed in a structure in which the one-way exhaust valve is mounted in the sealed portion of the battery case. Consequently, when high-pressure gas is generated in the battery due to the abnormal operation of the battery, the gas is immediately exhausted through the exhaust valve, and therefore, the lowering in efficiency of the battery due to the internal high-pressure gas of the battery is minimized.

As previously mentioned, on the other hand, the sealed portion, formed at the outer circumference of the plate-shaped battery case, is partially cut out, or the non-welded part is partially formed at the sealed portion, so as to exhaust gas out of the battery according to the conventional art. In this case, however, the leakage of the electrolyte may occur, or external moisture may permeate into the battery, with the result that the efficiency of the battery is lowered. Also, after the sealed portion is separated to exhaust the gas out of the battery, the reuse of the battery is not possible.

In the secondary battery according to the present invention, on the other hand, the one-way exhaust valve is constructed in a structure to prevent external gas or moisture from being introduced into the battery cell during the normal operation of the battery. Furthermore, the introduction of the external gas or moisture into the battery cell is still prevented even after the exhaust of the high-pressure gas, unlike the conventional disposable gas exhaust mechanism. In other words, the sealability is still maintained after the exhaust of the high-pressure gas. Consequently, the repetitive use of the battery is possible. Also, it is possible to easily control the exhaust of the gas by changing the location of the one-way exhaust valve. Consequently, a problem caused by the indiscreet exhaust of noxious gas is solved.

The battery case may be made of a laminate sheet, preferably an aluminum laminate sheet, including a resin layer and a metal layer. This pouch-shaped battery case seals the electrode assembly, mounted in the battery case, by thermally welding the sealed portion, formed at the outer circumference of the battery case.

The electrode assembly is not particularly restricted so long as the electrode assembly is constructed in a structure in which separators are disposed respectively between cathodes and anodes. For example, the electrode assembly may be constructed in a folding, stacking, or stacking/folding type structure. The details of the stacking/folding type electrode assembly are disclosed in Korean Patent Application Publication No. 2001-0082058, No. 2001-0082059, and No. 2001-0082060, which have been filed in the name of the applicant of the present patent application. The disclosures of the above-mentioned patent publications are hereby incorporated by reference as if fully set forth therein.

According to the present invention, the one-way exhaust valve may be constructed in various structures so long as the one-way exhaust valve does not increase the overall thickness of the battery, although the one-way exhaust valve is applied to the sealed portion of the plate-shaped secondary battery, and the one-way exhaust valve serves to exhaust the internal high-pressure gas out of the battery cell and prevent external gas from being introduced into the battery cell.

In a preferred embodiment, the one-way exhaust valve includes (a) a first film attached to the sealed portion, (b) a porous film constructed in a structure in which the outer circumference of the porous film, excluding an upper end opening of the one-way exhaust valve, is coupled to the first film, and the upper end of the porous film is lower than that of the first film, (c) a variable film constructed in a structure in which the outer circumference of the variable film, excluding the upper end opening of the one-way exhaust valve, is coupled to the porous film, the lower end of the variable film is coupled to the porous film at a position where the lower end of the variable film is spaced apart from the lower end of the porous film by a predetermined width, and the upper end of the variable film is higher than that of the porous film, the variable film being made of a material more flexible than that of the porous film or having a thickness less than that of the porous film, and (d) a second film constructed in a structure in which the second film is attached to the sealed portion at the opposite side of the first film, and the outer circumference of the second film, excluding the upper end opening of the one-way exhaust valve, is coupled to the lower end of the variable film.

Consequently, the one-way exhaust valve maintains the sealability of the battery by the stable coupling of the first film and the second film to the sealed portion of the battery case. Also, the internal gas is effectively exhausted from the battery through the upper end of the one-way exhaust valve by the separation between the films at the upper end of the one-way exhaust valve while the introduction and discharge of matters, excluding the gas, are prevented by the porous film, which is in contact with the first film to constitute the outermost part of the one-way exhaust valve at the lower end of the one-way exhaust valve.

For convenience of description, the end of the valve adjacent to the outside of the battery from the sealed portion of the battery case is referred to as the upper end of the valve, and the end of the valve adjacent to the inside of the battery is referred to as the lower end of the valve in the specification.

According to circumstances, the opening and closing of the one-way exhaust valve may be decided depending upon the structure of the variable film at the upper end of the one-way exhaust valve. More specifically, the variable film is coupled to the first film, during the normal operation of the battery, to close the upper end of the one-way exhaust valve. When the internal pressure is increased due to the abnormal operation of the battery, the variable film is separated from the first film to open the upper end of the one-way exhaust valve.

When the internal pressure of the battery is reduced to the normal state, such that the internal pressure of the battery equals to the external pressure, after the exhaust of the gas through the opening of the upper end of the one-way exhaust valve, the variable film is brought into contact with the first film, whereby the sealability of the battery is maintained.

In a preferred embodiment, the variable film is made of an elastic material, and the upper end of the variable film is bent toward the first film. Specifically, the variable film is brought into contact with the first film such that the bent state of the variable film is maintained after the exhaust of the gas.

At this time, the variable film is larger than the upper end of the porous film at the upper end of the exhaust valve and is smaller than the lower end of the porous film at the lower end of the exhaust valve. Consequently, the one-way exhaust valve may be constructed in a structure in which the lower end of the one-way exhaust valve is composed of the porous film, and the upper end of the one-way exhaust valve is surrounded by the variable film, during the normal operation of the battery.

In the above-described preferred embodiment, the upper end opening of the one-way exhaust valve is formed in the sealed portion of the battery case such that the upper end opening of the one-way exhaust valve communicates with the outside of the battery cell. Specifically, the one-way exhaust valve is in contact with the outer edge of the sealed portion, such that the upper end opening of the one-way exhaust valve communicates with the outside of the battery cell, and is in contact with the inner edge of the sealed portion, such that the lower end of the one-way exhaust valve, which is composed of the porous film, communicates with the interior of the battery cell. In this case, the upper end opening of the one-way exhaust valve may be closed by the variable film, which is in contact with the first film.

Also, the exhaust valve is preferably closed in a structure in which the first film is in contact with the second film to further improve the sealability of the battery case. The first film and the second film are made of a material having a specific elastic force or a restoring force against the deformation of the first film and the second film. For example, the contact structure between the first film and the second film may be a structure in which the upper end of the first film is bent toward the upper end of the second film or a structure in which the upper end of the second film is bent toward the upper end of the first film.

In another preferred embodiment, the upper end of the first film is located at the same height as the end of the sealed portion, or the upper end of the first film is bent perpendicularly to the section of the sealed portion. Alternatively, the upper end of the second film may be bent such that the upper end of the second film is brought into contact with the first film or the vertical section of the sealed portion. In this case, the upper end of the gas exhaust valve does not protrude outward, and therefore, the treatment of the gas exhaust valve is easy and convenient.

Consequently, when the internal pressure of the battery is increased due to the abnormal operation of the battery, the separation between the variable film and the first film and the separation between the first film and the second film are successively effected at the upper end of the gas exhaust valve, whereby the internal gas is exhausted from the battery. After the exhaust of the gas, the first film and the second film are brought into contact with each other, and therefore, the introduction of external gas or moisture into the battery is prevented. Consequently, the reuse of the battery is possible.

In the above-described preferred embodiment, the upper end opening of the one-way exhaust valve is closed by the sealed portion by a predetermined width. Specifically, the one-way exhaust valve may be constructed in a structure in which the one-way exhaust valve is spaced apart from the outer edge of the sealed portion by a predetermined width, such that the upper end opening of the one-way exhaust valve is located in the sealed portion, and is in contact with the inner edge of the sealed portion such that the lower end of the one-way exhaust valve, constituted by the porous film, communicates with the interior of the battery cell.

In this case, the upper end opening of the one-way exhaust valve may be closed by the variable film, attached to the first film or by the sealed portion, sealing the electrode assembly. Consequently, when the internal pressure of the battery is increased due to the abnormal operation of the battery, the separation between the variable film and the first film and the separation of the sealed portion are successively effected at the upper end of the gas exhaust valve, whereby the internal gas is exhausted from the battery. This structure is preferable to securing the sealability of the battery especially during the normal operation of the battery. This structure allows the gas to be exhausted only when a great amount of pressure is generated in the battery.

Here, the width of the sealed portion closing the upper end opening of the one-way exhaust valve is not particularly restricted. Preferably, however, the width of the sealed portion closing the upper end opening of the one-way exhaust valve is 10 to 60% that of the total width of the sealed portion in consideration of the sealability of the battery during the normal operation of the battery and the pressure of gas allowed for the safety of the battery.

In a preferred embodiment, the porous film is a gas and liquid separation film that is capable of allowing a gas component, i.e., gas, to pass therethrough while maximally restraining a liquid component, i.e., an electrolyte, from passing therethrough.

The secondary battery according to the present invention is preferably applicable to a lithium secondary battery, which is manufactured by impregnating the electrode assembly with a lithium-containing electrolyte while the electrode assembly is mounted in a battery case.

In accordance with another aspect of the present invention, there is provided a middle- or large-sized battery pack of high output and large capacity, including the secondary battery with the above-stated construction as a unit cell. It is required for the middle- or large-sized battery pack, which is used for electric vehicles or hybrid electric vehicles, to have a long-term operation life span and high safety. When the deterioration of the battery pack is accelerated due to gas generated in the unit cell, the life span of the battery pack is greatly lowered. Also, the abnormal operation of the battery pack, caused from some unit cells, greatly lowers the safety of the battery pack. For this reason, the above-described one-way exhaust valve is preferably applied to the battery pack.

The general structure of the lithium secondary battery and the middle- or large-sized battery pack and a method of manufacturing the lithium secondary battery and the middle- or large-sized battery pack are well known in the art to which the present invention pertains, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 1:
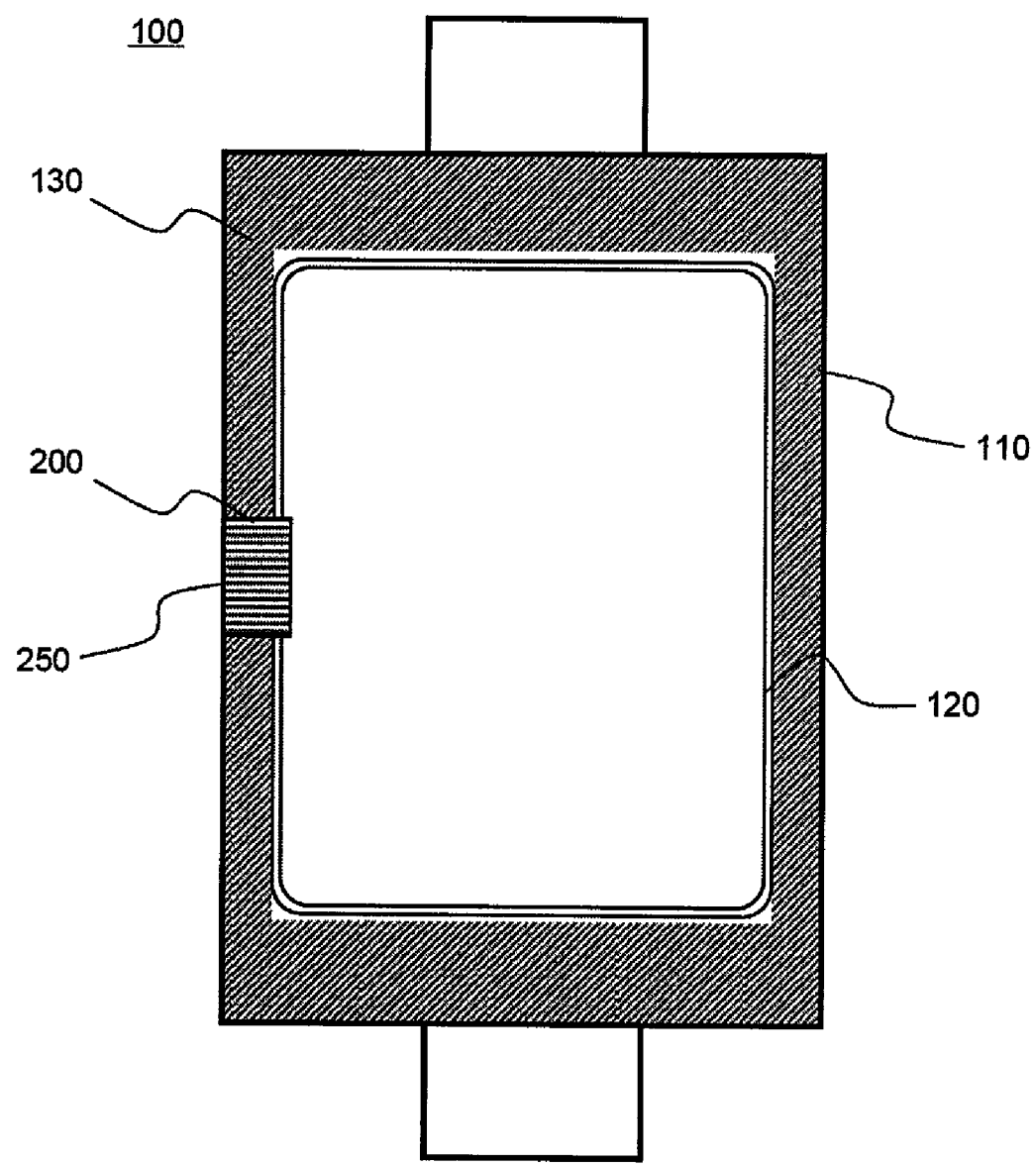
FIG. 1 is a plan view illustrating a pouch-shaped secondary battery according to a preferred embodiment of the present invention.

FIG. 1 is a plan view illustrating a pouch-shaped secondary battery according to a preferred embodiment of the present invention. The secondary battery of FIG. 1 is approximately identical to a conventional pouch-shaped secondary battery, which is being generally used, and therefore, only the characteristics of the present invention will be described hereinafter.

Referring to FIG. 1, the secondary battery 100 is constructed in a structure in which a sealed portion 130 is formed along the outer circumference of an electrode assembly receiving part 120 of a battery case 110, made of an aluminum laminate sheet, and a one-way exhaust valve 200 is mounted at the sealing portion 130.

The one-way exhaust valve 200 is constructed in a structure in which the one-way exhaust valve 200 exhausts internal high-pressure gas from the battery cell, while the one-way exhaust valve 200 prevents external gas from being introduced into a battery cell, during the abnormal operation of the secondary battery 100. This structure is more clearly understood from FIGS. 2 and 3, which typically illustrate the operation of the exhaust valve when the secondary battery 100 is switched from its normal operation to its abnormal operation.

Referring to these drawings, the one-way exhaust valve 200 is constructed in a small-thickness structure in which a first film 210, a porous film 220, a variable film 230, and a second film 240 are stacked in a specific stacking fashion.

The first film 210 is directly attached to the sealed portion 130 of the battery.

The porous film 220 is constructed in a structure in which the outer circumference of the porous film 220, excluding an upper end opening 250 of the one-way exhaust valve 200, is coupled to the first film 210, and the upper end of the porous film 220 is lower than that of the first film 210.

The variable film 230 is constructed in a structure in which the outer circumference of the variable film 230, excluding the upper end opening 250 of the one-way exhaust valve 200, is coupled to the porous film 220, the lower end of the variable film 230 is coupled to the porous film 220 at a position (dotted-line circle A) where the lower end of the variable film 230 is spaced apart from the lower end of the porous film 220 by a predetermined width, and the upper end of the variable film 230 is higher than that of the porous film 220.

The second film 240 is constructed in a structure in which the second film 240 is attached to the sealed portion 130 at the opposite side of the first film 210, and the outer circumference of the second film 240, excluding the upper end opening 250 of the one-way exhaust valve 200, is coupled to the lower end of the variable film 230.

Figure 2:
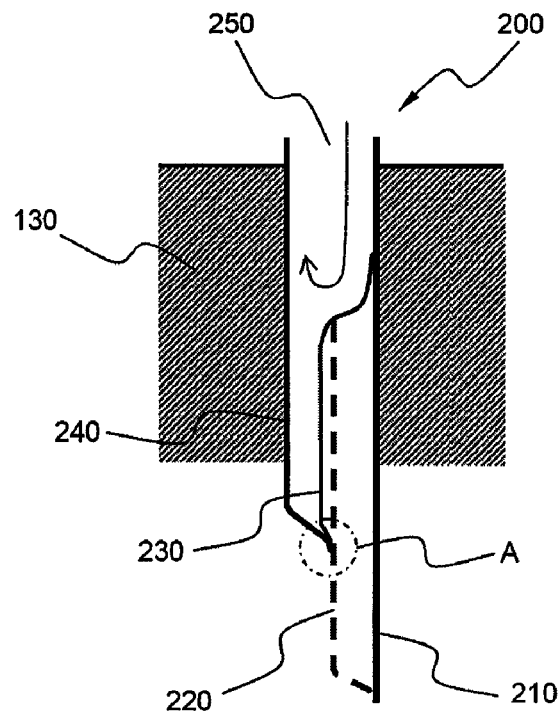
FIGS. 2 and 3 are typical views of a gas exhaust valve according to a first embodiment of the present invention, illustrating the operation of the exhaust valve, mounted at a sealed portion, when the secondary battery is switched from its normal operation to its abnormal operation.
Figure 3:
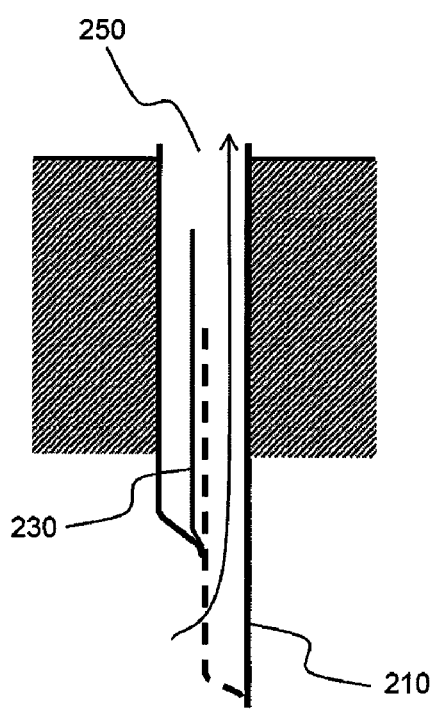

During the normal operation of the battery, as shown in FIG. 2, the upper end opening 250 of the gas exhaust valve 200 is closed by the variable film 230 attached to the first film 210. When internal pressure of the battery increases due to the abnormal operation of the battery, on the other hand, the variable film 230 is separated from the first film 210, as shown in FIG. 3, with the result that the upper end opening 250 of the one-way exhaust valve 200 is opened. Consequently, the one-way exhaust valve 200 prevents the introduction of external gas into the battery, by the variable film 130 closing the upper end opening 250 of the gas exhaust valve 200, during the normal operation of the battery, and, when the battery is abnormally operated, the variable film 230 is separated from the first film, due to the increase of pressure in the battery, whereby the one-way exhaust valve 200 effectively exhausts the internal gas from the battery.

The one-way exhaust valve 200 may be mounted at a position adjacent to the outer edge of the sealed portion 130 such that the upper end opening 250 of the gas exhaust valve 200 communicates with the outside of the battery. Alternatively, as shown in FIG. 4, the upper end opening 250 of the one-way exhaust valve 200 may be located in the sealed portion 130.

As shown in FIGS. 2 and 3, the one-way exhaust valve 200 is closed by the coupling between the first film 210 and the variable film 230 and the coupling between the first film 210 and the second film 240 at the upper end opening 250 of the one-way exhaust valve 200, while the upper end opening 250 of the one-way exhaust valve 200 is in contact with the outer edge of the sealed portion 130, thereby preventing the introduction of foreign matter into the battery, and is opened by the separation between the films 210 and 230 and the separation between the films 210 and 240, when the internal pressure of the battery increases, thereby allowing the internal gas to be exhausted from the battery.

Figure 4:
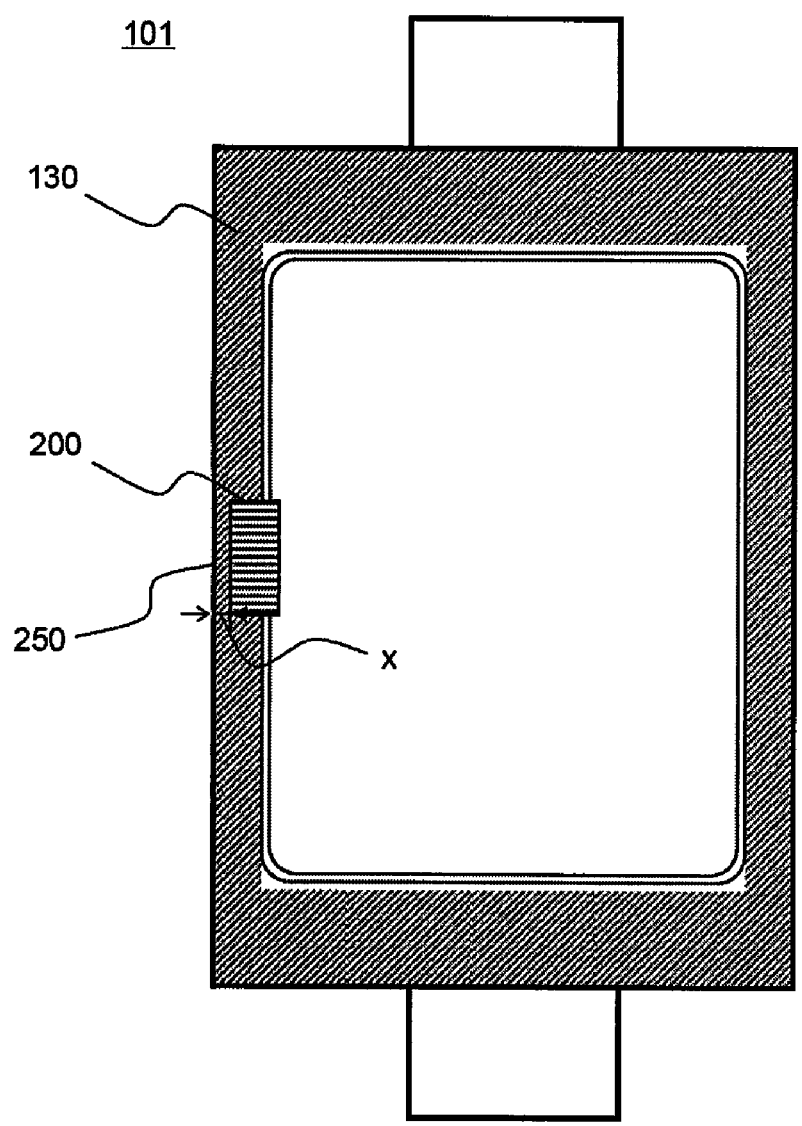
FIG. 4 is a plan view illustrating a secondary battery, having an exhaust valve, according to a modification of the present invention shown in FIG. 1.

When the upper end opening 250 of the gas exhaust valve 200 is located in the sealed portion 130, as shown in FIG. 4, the one-way exhaust valve 200 is closed by the first film 210 and the variable film 230, which are coupled to each other, and the sealed portion 130 by a predetermined width x, thereby preventing the introduction of foreign matter into the battery, and is opened by the separation between the films 210 and 230 and the separation of the sealed portion 130, when the internal pressure of the battery increases, thereby allowing the internal gas to be exhausted from the battery. Consequently, the sealed portion 130 is capable of simultaneously performing the sealing function and the gas exhaust function, which are opposite action mechanisms.

Also, the one-way exhaust valve 200 is mounted such that the lower end of the one-way exhaust valve 200, which is opposite to the upper end opening 250 of the one-way exhaust valve 200 and at which the porous film 220 constitutes the outermost part of the one-way exhaust valve 200, is located in the battery cell. Consequently, a large amount of gas, generated in the battery cell when the battery is abnormally operated, is exhausted out of the battery through the porous film 220; however, other matters, excluding the gas, are not allowed to be discharged from the battery.

Figure 5:
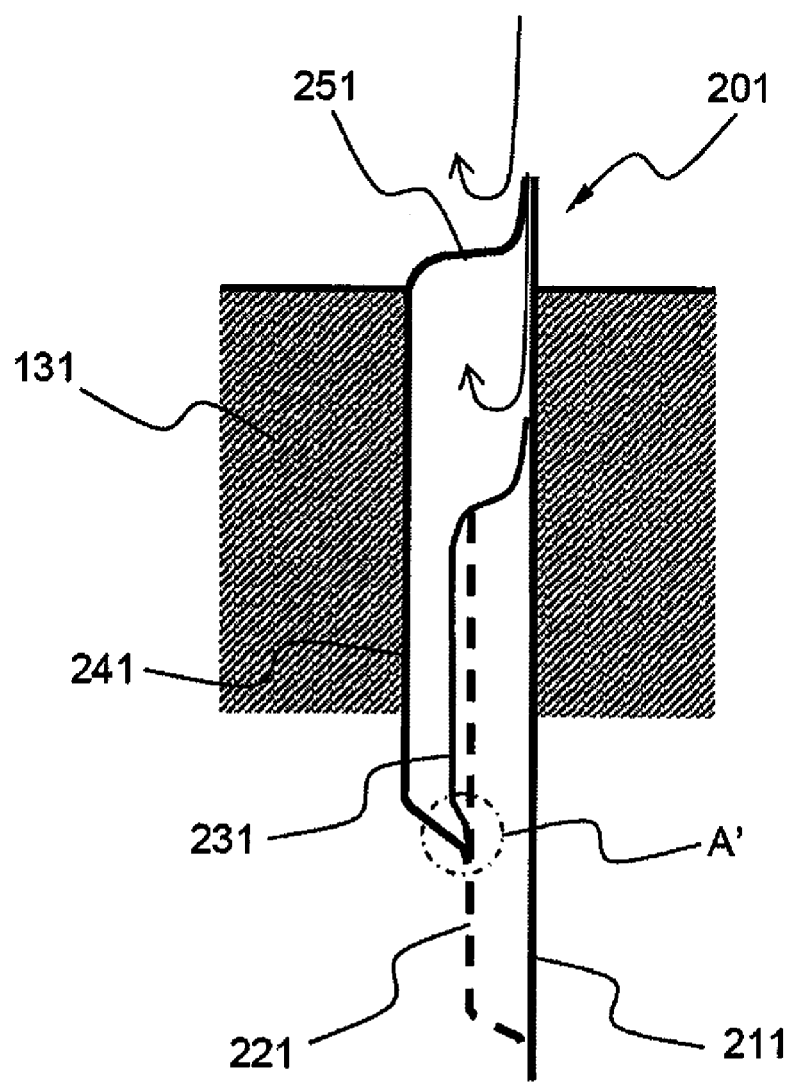
FIGS. 5 and 6 are typical views of a gas exhaust valve according to a second embodiment of the present invention, illustrating the operation of the exhaust valve, mounted at a sealed portion, when the secondary battery is switched from its normal operation to its abnormal operation.
Figure 6:
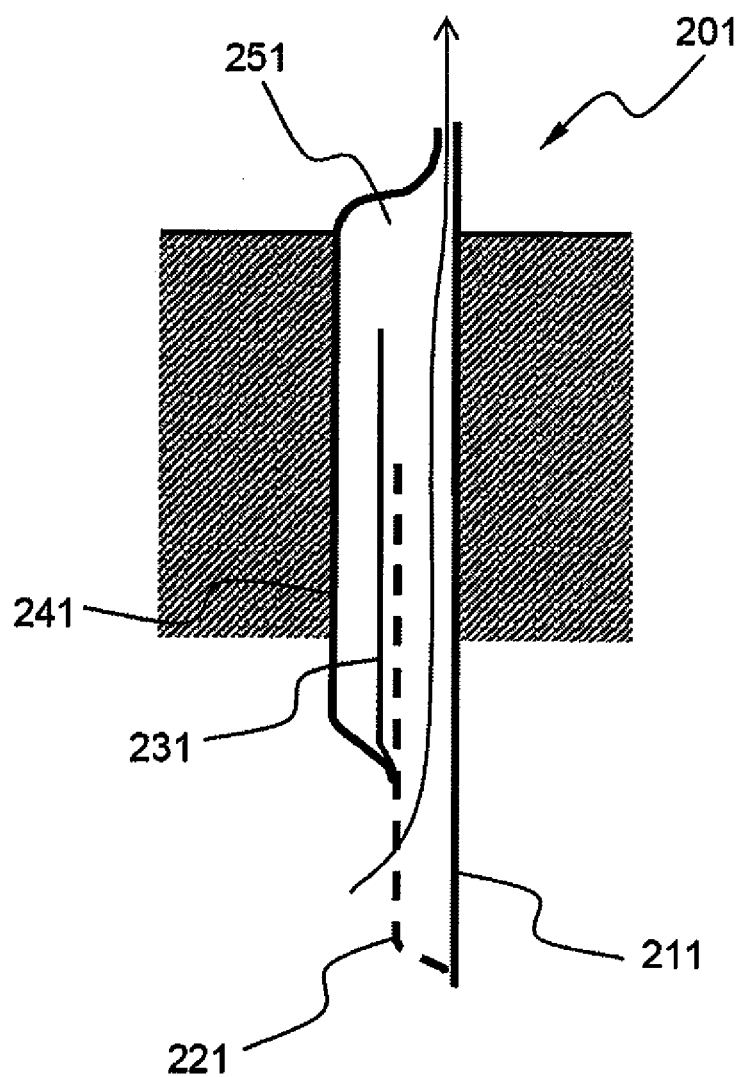
Figure 7:
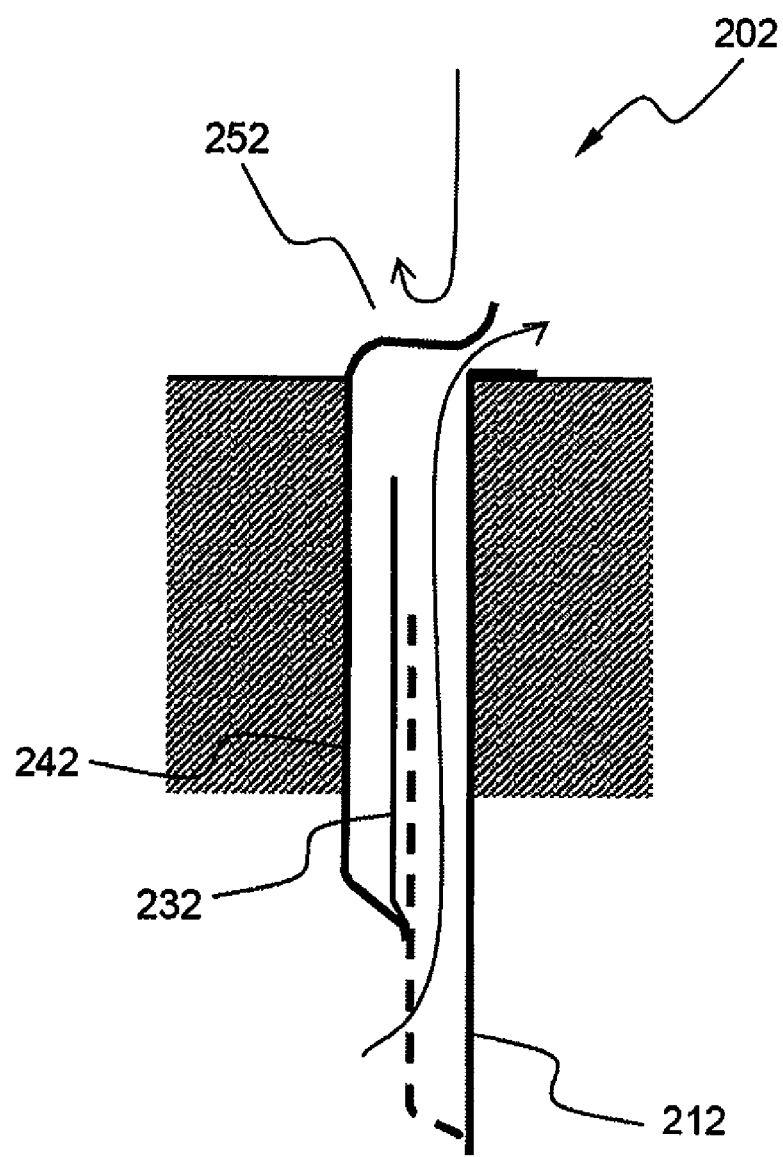
FIG. 7 is a typical view of a gas exhaust valve according to a third embodiment of the present invention, illustrating the operation of the exhaust valve when gas is exhausted from the secondary battery due to the abnormal operation of the secondary battery.

FIGS. 5 and 6 are typical views of a gas exhaust valve according to a second embodiment of the present invention, illustrating the operation of the exhaust valve, mounted at a sealed portion, when the secondary battery is switched from its normal operation to its abnormal operation. Also, FIG. 7 is a typical view of a gas exhaust valve according to a third embodiment of the present invention, illustrating the operation of the exhaust valve when gas is exhausted from the secondary battery due to the abnormal operation of the secondary battery. Components of the gas exhaust valve shown in FIGS. 5 and 6, except for the contact at the upper end of the gas exhaust valve, are identical to those of the gas exhaust valve shown in FIGS. 5 and 6, and therefore, a detailed description thereof will not be given.

Referring first to FIGS. 5 and 6, the gas exhaust valve 201 is constructed in a structure in which a second film 241 is elastically bent toward a first film 211, such that one end of the second film 241 is in contact with one end of the first film 211, whereby the upper end of the gas exhaust valve 201 is sealed. Consequently, when the internal pressure of the battery increases due to the abnormal operation of the battery, as shown in FIG. 6, gas, having passed through a variable film 231, is exhausted out of the battery while the gas separates the first film 211 and the second film 241 from each other. On the other hand, during the normal operation of the battery or after the gas is exhausted out of the battery due to the abnormal operation of the battery, as shown in FIG. 5, the second film 241 is brought into contact with the first film 211 by the restoring force of the second film 241, whereby the upper end 251 of the gas exhaust valve 201 is closed.

Referring to FIG. 7, the gas exhaust valve 202 is constructed in a structure in which a first film 212 is bent in the vertical sectional direction of the sealed portion, such that the first film 212 is in tight contact with the sealed portion, and a second film 242 is elastically bent toward the first film 212, such that one end of the second film 242 is in contact with one end of the first film 212. Consequently, during the abnormal operation of the battery, gas, having passed through a variable film 232, is exhausted out of the battery while the gas separates the first film 212 and the second film 242 from each other. After the gas is completely exhausted out of the battery, the second film 242 is brought into contact with the first film 212. The gas exhaust valve 202 constructed in the above-described structure has an advantage in that the upper end 252 of the gas exhaust valve 202 does not protrude outward, and therefore, the treatment of the gas exhaust valve 202 is easy and convenient.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the secondary battery according to the present invention has the effect of effectively exhausting internal high-pressure gas generated during the abnormal operation of the battery, such as overcharge, out of the battery case, while maintaining the sealability of the battery case, thereby simultaneously improving the efficiency and safety of the battery.

The invention claimed is:

1. A plate-shaped secondary battery constructed in a structure in which an electrode assembly of a cathode/separator/anode structure is mounted in a battery case, and the battery case is sealed by thermal welding,
    wherein the secondary battery comprises at least one one-way exhaust valve, mounted at a sealed portion, formed at the outer circumference of an electrode assembly receiving part of the battery case, for allowing internal high-pressure gas to be exhausted out of a battery cell and preventing external gas from being introduced into the battery cell, and
    wherein the one-way exhaust valve comprises
    a first film attached to the sealed portion,
    a porous film constructed in a structure in which the outer circumference of the porous film, excluding an upper end opening of the one-way exhaust valve, is coupled to the first film, and the upper end of the porous film is lower than that of the first film,
    a variable film constructed in a structure in which the outer circumference of the variable film, excluding the upper end opening of the one-way exhaust valve, is coupled to the porous film, the lower end of the variable film is coupled to the porous film at a position where the lower end of the variable film is spaced apart from the lower end of the porous film by a predetermined width, and the upper end of the variable film is higher than that of the porous film, the variable film being made of a material more flexible than that of the porous film or having a thickness less than that of the porous film, and
    a second film constructed in a structure in which the second film is attached to the sealed portion at the opposite side of the first film, and the outer circumference of the second film, excluding the upper end opening of the one-way exhaust valve, is coupled to the lower end of the variable film; and wherein the upper end opening of the one-way exhaust valve is closed by the sealed portion by a predetermined width.

2. The secondary battery according to claim 1, wherein the battery case is made of a laminate sheet including a resin layer and a metal layer.

3. The secondary battery according to claim 2, wherein the sheet is an aluminum laminate sheet.

4. The secondary battery according to claim 1, wherein the electrode assembly is constructed in a folding, stacking, or stacking/folding type structure.

5. The secondary battery according to claim 1, wherein the variable film is made of an elastic material, and the upper end of the variable film is bent toward the first film.

6. The secondary battery according to claim 1, wherein the upper end of the first film is in contact with the upper end of the second film during the normal operation of the battery.

7. The secondary battery according to claim 1, wherein the upper end opening of the one-way exhaust valve is formed in the sealed portion such that the upper end opening of the one-way exhaust valve communicates with the outside of the battery cell.

8. The secondary battery according to claim 1, wherein the width of the sealed portion closing the upper end opening of the one-way exhaust valve is 10 to 60% that of the total width of the sealed portion.

9. The secondary battery according to claim 1, wherein the porous film is a gas and liquid separation film.

10. The secondary battery according to claim 1, wherein the battery is a lithium secondary battery.

11. A middle- or large-sized battery pack of high output and large capacity, including a secondary battery according to claim 1 as a unit cell.

* * * * *